US012430198B1

(12) United States Patent
Moukarzel et al.

(10) Patent No.: US 12,430,198 B1
(45) Date of Patent: Sep. 30, 2025

(54) TREE-BASED SYSTEM PROBLEM PREDICTION AND MITIGATION

(71) Applicant: Federal Home Loan Mortgage Corporation (Freddie Mac), McLean, VA (US)

(72) Inventors: Keenan Moukarzel, Orlando, FL (US); Tatyana Krol, Reston, VA (US); Chengcheng Xiong, Fairfax, VA (US)

(73) Assignee: Federal Home Loan Mortgage Corporation ("FREDDIE MAC"), McLean, VA (US)

( * ) Notice: Subject to any disclaimer, the term of this patent is extended or adjusted under 35 U.S.C. 154(b) by 119 days.

(21) Appl. No.: 17/961,168

(22) Filed: Oct. 6, 2022

(51) Int. Cl.
  *G06F 11/07* (2006.01)
  *G06F 11/30* (2006.01)
  *G06F 11/34* (2006.01)

(52) U.S. Cl.
  CPC ...... *G06F 11/0793* (2013.01); *G06F 11/3072* (2013.01); *G06F 11/3452* (2013.01); *G06F 11/0709* (2013.01)

(58) Field of Classification Search
  CPC ............. G06F 11/3447; G06F 11/3452; G06F 11/0793; H04L 41/0636; H04L 41/16
  See application file for complete search history.

(56) References Cited

U.S. PATENT DOCUMENTS

| 10,613,962 | B1 * | 4/2020 | Delange | G06F 11/3006 |
|---|---|---|---|---|
| 2008/0250265 | A1 * | 10/2008 | Chang | H04L 41/0663 |
| | | | | 714/4.12 |
| 2015/0235139 | A1 * | 8/2015 | Sharma | G06N 5/043 |
| | | | | 706/58 |
| 2017/0054605 | A1 * | 2/2017 | Duncan | H04L 41/145 |
| 2020/0042370 | A1 * | 2/2020 | Kao | G06F 11/008 |
| 2020/0278900 | A1 * | 9/2020 | Abdelsalam | G06F 11/079 |
| 2021/0097411 | A1 * | 4/2021 | Guntur | G06N 20/20 |
| 2021/0133017 | A1 * | 5/2021 | Cheng | H04L 41/064 |
| 2022/0066906 | A1 * | 3/2022 | Kumar | G06F 11/302 |
| 2022/0091915 | A1 * | 3/2022 | Perneti | G06F 3/0653 |

* cited by examiner

*Primary Examiner* — Gabriel Chu
(74) *Attorney, Agent, or Firm* — Finch & Maloney PLLC

(57) ABSTRACT

In an illustrative embodiment, systems and methods for predicting network service outages gather log data from processes executing on computing device(s), produce training data from the log data for training tree-based machine learning model(s) and metrics calculated therefrom, periodically apply data sets derived from future log data and metrics calculated therefrom to the machine learning model(s) to predict critical error(s)/system outage(s), and periodically update the trained machine learning models using the periodically applied data sets.

18 Claims, 7 Drawing Sheets

TREE-BASED SYSTEM PROBLEM PREDICTION AND MITIGATION

BACKGROUND

System log data, error messages, warnings, and usage statistics are used by information technology (IT) personnel to gauge health of a network system architecture and the applications executing thereon. However, errors, warnings, and statistics often direct IT professionals to serious problems when they have already arisen. For example, using present technology, IT professionals will learn about significant network bandwidth problems, hardware errors, or other bottlenecks and/or failures after they have already occurred. These alerts or warnings, for example, may relate to memory utilization, processing time, and/or incoming traffic flow (e.g., jobs, requests, etc.). When an error occurs, the IT professionals will investigate the cause of the error and triage the problem (e.g., reboot a system, kill a runaway process eating up memory space, etc.). The inventors recognized a need for predictive analytics to anticipate computing system problems, thereby allowing IT professionals to proactively apply mitigation strategies, thereby maintaining application operation and communications flow.

SUMMARY OF ILLUSTRATIVE EMBODIMENTS

The foregoing general description of the illustrative implementations and the following detailed description thereof are merely exemplary aspects of the teachings of this disclosure, and are not restrictive.

In one aspect, the present disclosure relates to a system for predicting network service outages in a computing network, the computing network including a number of processes executing on processing circuitry of one or more computing devices, each process of at least a portion of the number of processes generating log data related to functionality of the respective process, the system including a set of alert rules, and processing circuitry configured to perform a number of operations, the operations including generating training data including data entries from a number of log data sets and a number of associated metrics related to a number of processes of a networked computing system, the generating including repeatedly, for each process of at least a portion of the number of processes and over a first window of time, collecting a log data set generated by the respective process, converting at least a portion of a number of data entries of the log data set into a training data set having a standard format, and calculating, from a subset of the number of data entries, one or more metrics related to the respective process. The operations may include using the training data to train one or more tree-based machine learning classifiers to predict future critical events and/or outages within a threshold window of time prior to each future critical event and/or outage, and periodically applying the one or more tree-based machine learning classifiers to additional data sets and additional metrics derived from future log data sets of the at least the portion of the number of processes, where applying includes obtaining, from the one or more tree-based machine learning classifiers, a set of predictions, each prediction of the set of predictions including a respective reason and a respective confidence, and applying the set of alert rules to the set of predictions to determine one or more alerts to issue regarding at least one prediction of the set of predictions. The operations may include using the additional data sets and additional metrics, periodically updating the training of the one or more tree-based machine learning classifiers.

In some embodiments, the standardized format of the training data set includes a two-dimensional table. The threshold period of time may be between ten minutes and two hours. Periodically applying the one or more tree-based machine learning classifiers may be performed more frequently than the threshold period of time. For one or more of the number of processes, the one or more metrics include at least one of a maximum processing time metric, a minimum processing time metric, and a process start with no end metric.

In some embodiments, training the one or more tree-based machine learning classifiers includes executing one or more model tree algorithms to construct multiple decision trees based on at least a portion of the training data. The reason for each prediction of at least a portion of the set of predictions may identify a given process of the number of processes, a computing device, or a data store exhibiting conditions predicted to contribute to at least one critical error or critical event. The reason for one or more predictions of the set of predictions may identify an indirect process called by a given process of the number of processes, where the indirect process is different than the number of processes.

In some embodiments, generating the training data includes, for each process of one or more respective processes of the number of processes, identifying a number of external calls to the respective process, where each external call of the number of external calls is directed to a given process, a given computing device, a given database, or a given service external to the respective process. Each external call may be directed to the given process is directed to a process different than the number of processes.

In some embodiments, the operations include analyzing the set of predictions to determine a set of top features most likely to lead to a critical error and/or a system outage; and causing presentation of the set of top features at a graphical user interface of a computing device. The operations may include ranking the set of top features by at least one of urgency and confidence of prediction. Causing presentation of the set of top features may include causing presentation of the set of top features in order of the ranking.

In some embodiments, the operations include analyzing the set of predictions to determine a set of top processes of the number of processes at greatest risk of producing a critical error or an outage, and identifying, for each process of the set of top processes, a corresponding action for avoiding the respective critical error or the respective outage. The operations may include causing presentation of the set of top processes and the corresponding action for each process of the set of top processes at a graphical user interface of a computing device. The operations may include ranking the set of top processes by at least one of urgency and confidence of prediction. Causing presentation of the set of top processes may include causing presentation of the set of top processes in order of the ranking. The operations may include automatically applying, for at least one process of the set of top processes, the corresponding action. The corresponding action, for at least one process of the set of top processes, may include rebooting a computing device or reducing load on a computing device.

In some embodiments, the processing circuitry includes at least one of i) software logic including a number of instructions configured to execute at least a first portion of the number of operations on one or more processors, or ii)

hardware logic configured to execute at least a second portion of the number of operations.

In one aspect, the present disclosure relates to a method for predicting network service outages in a computing network, the computing network including a number of processes executing on processing circuitry of one or more computing devices, each respective process of at least a portion of the number of processes generating log data related to functionality of the respective process, the method including generating, by processing circuitry, training data including data entries from a number of log data sets and a number of associated metrics related to at least a portion of a number of processes of a networked computing system, the generating including, for each process of the number of processes and over a window of time, periodically collecting a log data set generated by the respective process, converting at least a portion of a number of data entries of the log data set into a training data set having a standard format, and calculating, from a subset of the number of data entries, one or more metrics related to the respective process. The method may include, for each process of the at least the portion of the number of processes, aggregating the training data sets and the one or more metrics to produce aggregated training data and aggregated metrics. The method may include using at least the aggregated training data sets and the aggregated metrics, training, by the processing circuitry, one or more tree-based machine learning models to predict future critical events and/or outages within a threshold window of time prior to each future critical event and/or outage. The method may include periodically applying, by the processing circuitry, the one or more tree-based machine learning models to additional data sets and additional metrics derived from future log data sets of the at least the portion of the number of processes to assess the networked computing system for risk of critical errors and/or system outages, where applying includes obtaining, from the one or more tree-based machine learning models, a set of predictions, each prediction of the set of predictions including a respective reason and a respective confidence, analyzing the set of predictions to determine a set of top processes of the number of processes at greatest risk of producing a critical error or a system outage, and identifying, for each process of the set of top processes, a corresponding action for avoiding the respective critical error or the respective outage. The method may include using the additional data sets and additional metrics, periodically updating, by the processing circuitry, the training of the one or more tree-based machine learning models.

In some embodiments, the one or more tree-based machine learning models are trained further using the periodically converted training data sets and the periodically calculated one or more metrics.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
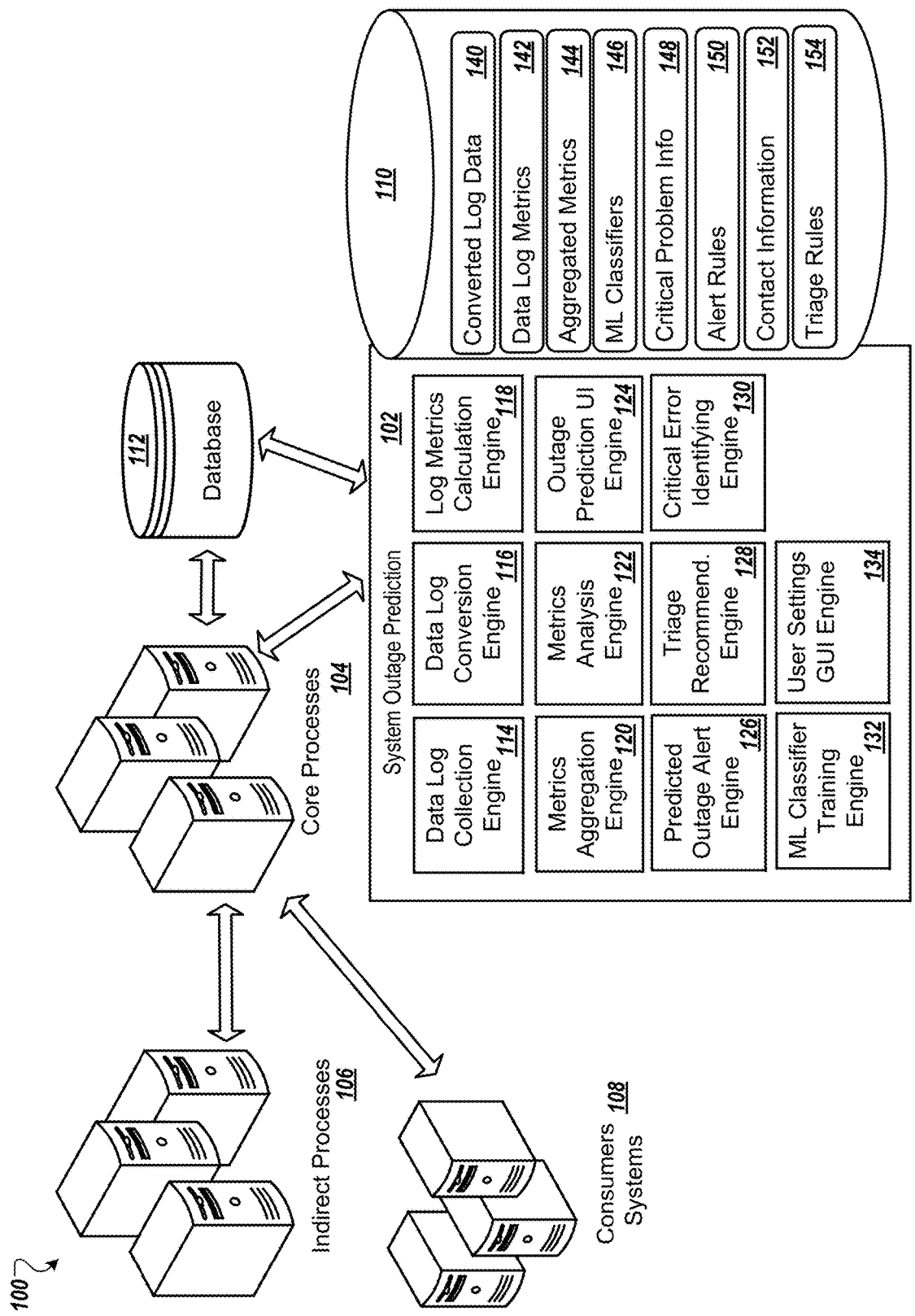
FIG. 1A is block diagram of an example environment for system outage prediction.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1A is a block diagram of an example networked computing environment 100 for system outage prediction. The environment includes a system 102 for system outage prediction configured to monitor the health of components of the networked computing environment 100 and analyze system functions to predict potential errors and/or system outages prior to the event of actual system failure and/or unreasonable slow-down in response time. The system 102, for example, may monitor communications between consumer systems 108 and one or more internal systems 104 executing core processes on behalf of requests submitted via the consumer systems 108. Further, the system 102 may monitor database 112 activities and accesses to the database 112 by the one or more internal systems 104. In addition, the system 102 may monitor interactions between the internal systems 104 and one or more additional systems 106 (e.g., external systems or servers, internal systems, etc.) executing indirect processes (e.g., processes unavailable to the system outage prediction system 102 for direct monitoring) that are executed responsive to requests produced by one or more of the core processes executing on the one or more internal systems 104. Data logs capturing information regarding the interactions, activities, and accesses may be analyzed by one or more trained machine learning classifiers 146 of the system 102 to identify patterns indicative of slowdowns, critical errors, and/or outages.

In some implementations, the system 102 includes a data log collection engine 114 configured to collect log data from the one or more internal systems 104. The log data, in some examples, may include data captured by the hardware of the system 104 (e.g., a multi-processor device, server, server blade, or other processing circuitry hardware component of the environment 100) detailing hardware and/or firmware-level operations, data captured on behalf of each of one or more core processes executing on the system 102, and/or communications data collected by the system 104 regarding network traffic received by and/or transferred through the system 104. Further, in some embodiments, the data log collection engine 114 is configured to collect log data regarding database accesses (e.g., queries), database storage metrics, and/or database read/write execution from one or more databases, system networks, data warehouses, or other data stores such as the database 112. The various log data may be captured by the data log collection engine 114 on a periodic basis such as, in some examples, every 5 seconds, every 30 seconds, every minute, every 5 minutes, every 10 minutes, or three or more times per hour. The data entries in each data log, further, may be timestamped according to a time at which each individual log entry is captured. For one or more systems, rather than collecting the log data, certain log entries (e.g., log entries regarding certain events, log entries at or above a certain level of criticality, etc.) may be automatically replicated by one or more monitored processes to a log data storage medium of the system outage prediction system 102.

In some implementations, a data log conversion engine 116 is configured to convert the data collected from the various data logs into a consistent format for analysis. The data logs, for example, may be stored in different formatting structures (e.g., JavaScript Object Notation (JSON), comma separated values (CSV), etc.). Further, different data logs may include different granularity and/or formatting of data information (e.g., different numbers of decimal points captured, different timestamp formats, etc.). Additionally, not all log data may be desired for analysis. Certain information known to be indicative of system problems (e.g., response times, memory usage, messaging queue depth, etc.) may be extracted from the log data rather than analyzing all log data. The data log conversion engine 116 may store the converted log data in a data store 110 as converted log data 140.

In an illustrative example, the data log conversion engine 116 may extract data from a data log including fields identifying a timestamp of the start/stop of a process, information regarding the data being processed, identification of one or more systems (e.g., hosts, servers, computing devices, etc.) are involved in the process, and identification of whether the process is beginning or ending. The data log conversion engine 116 may flatten the extracted log data into a two-dimensional table having a consistent format for further processing.

In some implementations, a data log metrics calculation engine 118 accesses the converted log data 140 and calculates metrics associated with the extracted data. The metrics, in some examples, may include numbers of calls to particular systems (servers, hosts, etc.), volumes of transactions in process, volumes of transactions pending processing, and/or processing times for certain processes (e.g., using an end time and a start time captured in the data log). In one aspect, at least a portion of the metrics may be considered as volumetric data at the process level, volumetric data at the host and container level, and system health metrics. Further to this example, volumetric data at the process level may include volume of calls, a number of retries, a number of non-critical errors, and/or a number of processing successes. The volumetric data at the host and container level may include server calls, container and labels calls, and/or host calls. The system health metrics may include processing times, processor (e.g., CPU) metrics and/or storage (e.g., memory) metrics. The metrics may be stored as a set of data log metrics 142.

Some metrics may represent information regarding activity over a timespan including multiple sets of converted log data 140 (e.g., 10 minutes of log data captured every 1 minute, etc.). A metrics aggregation engine 120, in some implementations, aggregates at least portions of the data log metrics 142 and/or the converted log data 140 to determine aggregate metrics. The aggregated metrics, in some examples, may include transactions per unit time (e.g., per second, per ten seconds, per minute, etc.), requests from consumers 108 per unit time, typical response times over a time period (e.g., mean, median, minimum and/or maximum), typical request volume over a time period, number of database accesses per unit time, and/or typical database access completion time over a time period. The aggregated metrics may be stored as aggregated metrics 144. The aggregated data, in some examples, may be aggregated every 10 minutes, every 20 minutes, every 30 minutes, and/or at least once per hour.

In some implementations, a metrics analysis engine 122 analyzes the data log metrics 142 and/or the aggregated metrics 144 to identify data patterns indicative of impending system trouble (e.g., critical error, failure, outage, etc.). The metrics analysis engine 122, in some embodiments, analyzes the data log metrics 142 and/or the aggregated metrics 144 using one or more trained machine learning (ML) classifiers 146. The machine learning classifiers 146 may be trained using historic data log metrics and/or aggregated metrics including data leading up to critical errors and/or other events that required IT professional support to resolve. The trained machine learning classifiers 146, for example, may be trained using a ML classifier training engine 132. The output of the trained machine learning classifiers 146 may include, in some examples, a likelihood of critical error (e.g., percentage, estimated time to occurrence of critical error), a likelihood of significant processing slow down, and/or a likelihood of significant communications failure (e.g., packet dropping). Further, in some implementations, the metrics analysis engine 122 derives one or more reasons related to the anticipated critical error/system event. The reasons, for example, may be determined through use of tree-based machine learning and/or neural network analysis. Information regarding the critical error(s)/system event(s) may be stored as critical problem information 148.

In some implementations, an outage prediction user interface engine 124 prepares, for presentation at a user interface, messages, graphs, a network element map, and/or other graphical user interfaces for relaying the critical problem information 148 regarding the critical event(s)/error(s) to information technology personnel. The outage prediction user interface engine 124, for example, may identify certain system components (e.g., processes, machines, storage devices, etc.) as demonstrating data log patterns associated with events leading up to critical errors/events. In some embodiments, the prediction user interface engine 124 estimates a number of critical errors likely to occur. Further, the outage prediction user interface engine 124 may provide information regarding the nature of the critical error/event (e.g., type of error/event, estimated time to error/event, estimated likelihood of error/event, other system elements likely to be impacted by the error/event, etc.).

A predicted outage alert engine 126, in some implementations, analyzes the critical problem information 148 in view of a set of alert rules 150 to identify circumstances in which one or more alerts should be issued. Alerts, in some examples, may include emails, text messages, telephone calls, audible alarms, and/or other notifications designed to draw attention to an impending critical error or event. The alert rules 150, for example, may include one or more threshold probabilities, such as a threshold probability associated with one or more types of critical errors or events, for triggering one or more corresponding alerts. The alert rules 150, in another example, may include one or more threshold periods of time to a likely critical error or event. In an additional example, the alert rules 150 may include one or more threshold numbers of anticipated critical errors (e.g., a prediction of eight critical errors may be more severed than a prediction of two critical errors). In a further example, the alert rules 150 may include one or more critical system elements, such as servers, databases, and/or edge communication routers, which may significantly harm external access to the system or processing throughput within the system. The aforementioned examples may be combined in different fashions (e.g., a threshold number of critical errors predicted to occur within a threshold period of time, etc.). The predicted outage alert engine 126, upon matching one of the alert rules 150 with the critical problem information 148, may issue one or more alerts to through corresponding alert channels identifying one or more contacts having contact information 152 (e.g., email addresses, phone numbers, account information, etc.).

In some implementations, a user settings graphical user interface (GUI) engine 134 provides users with options for setting up the output of the system outage prediction system 102. Further, the user settings GUI engine 134 may provide the opportunity for users to add new rules to the set of alert rules 150 and/or adjust thresholds of pre-existing rules of the set of alert rules 150. The customized alert rules 150 may be visible to only the originating user, or the user may have the option to share one or more customized alert rules 150 with other users of the system outage prediction system 102. In some embodiments, the user settings GUI engine 134 provides options for setting types of alerts (e.g., text, email, audible signal at computing device, etc.) for each rule of the alert rules 150 and/or the ability to opt in/opt out for individual alert rules 150.

In some implementations, a triage recommendation engine 128 is configured to provide recommendations regarding steps that information technology professionals could take to mitigate the problem, such as redirecting traffic to a different server, rebooting a system, and/or killing an errant/malicious task that is failing to release resources. The triage recommendation engine 128, for example, may identify at least a portion of the following: a system, a program and/or user, a brief problem statement, and one or more potential solutions. The potential solutions, for example, may be selected using a set of triage rules 154. For example, where an incoming call load is not being adequately managed by the process being called, the triage recommendation engine 128 may recommend that an additional instance of the process be launched. In another example, where an application process instance is demonstrating unreasonable processing usage and/or memory usage, the triage recommendation engine 128 may recommend that the application process instance be rebooted. In some embodiments, the recommendation engine 128 identifies one or more recommended triage options based on past efforts of IT professionals. For example, the recommendation engine 128 may obtain one or more recommended triage options from a machine learning model trained with data encompassing both log data and IT intervention action data (e.g., reboots, forced reconfigurations, etc.). The triage recommendation engine 128 may provide recommendation messages for distribution by the outage prediction UI engine 124 and/or the predicted outage alert engine 126.

Further, in some embodiments, certain triage recommendations may be automatically applied by the system outage prediction system 102, for example due to rate of pending problem (e.g., system resources being reserved rapidly), extent of pending system error, and/or length of time without receiving IT personnel input. In this manner, an automatic recovery mechanism may alleviate problems and/or resolve certain issues when IT input is unavailable and/or the requirement for recovery is too urgent (e.g., malicious attack underway).

In some implementations, a critical error identifying engine 130 identifies, from the converted log data 140, actual past critical errors. The critical error identifying engine 130 may further identify actions taken responsive to the error (e.g., rebooting of hardware, etc.) captured in the converted log data 140. The critical error identifying engine 130 may match the critical errors to predicted errors/outages identified by the outage prediction UI engine 124 during a time period prior to the critical error spotted by the critical error identifying engine 130. The analysis conducted by the critical error identifying engine 130 may be used to confirm functionality of the metrics analysis engine 122 in correctly analyzing and identifying impending critical errors.

In some implementations, the machine learning classifier training engine 132 trains the machine learning classifiers 146 on an ongoing basis to assure that, if any system updates (e.g., new hardware, firmware updates, new software, software version updates, new levels of users, etc.) introduce problems leading to critical errors, the critical errors will be captured by the system outage prediction system 102. Since networked systems commonly evolve, training may include updating, periodically, auto-training data such that the machine learning classifiers 146 adapt to the more recent network features, such that incidents caused by outdated hardware, firmware, software, and/or traffic patterns are naturally de-emphasized by the machine learning classifier(s) 146. In some embodiments, one or more incidents that are no longer applicable are removed from the training data, and any corresponding machine learning classifiers 146 recreated.

Figure 1B:
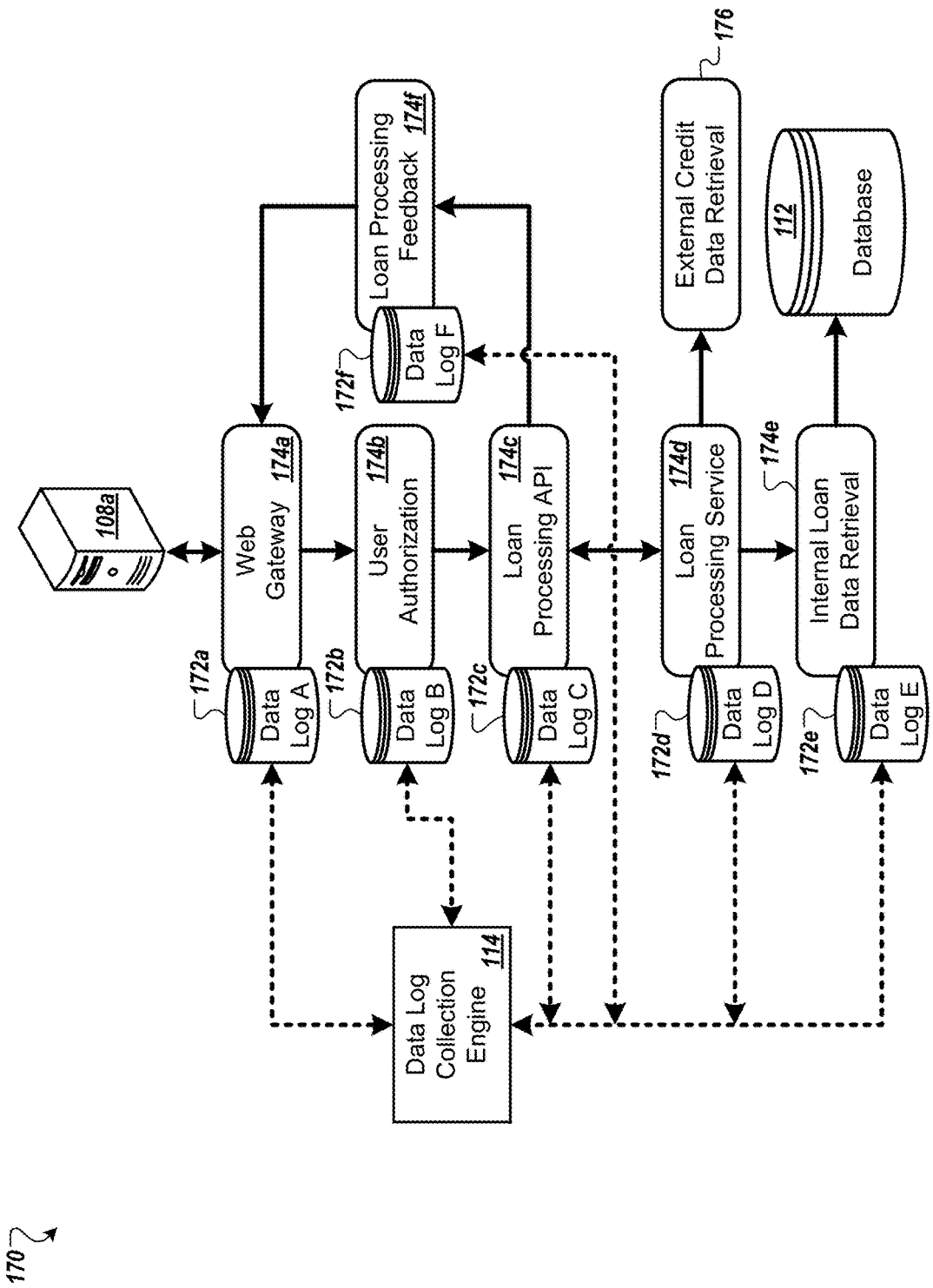
FIG. 1B is a process flow diagram of example log data accesses and process calls within the example environment of FIG. 1A.

FIG. 1B is a flow diagram of an example process 170 for log data accesses and process calls within the example environment of FIG. 1A. The process 170, for example, may be performed by the data log collection engine 114 to gather data logs 172 related to a set of core processes 174 (e.g., a portion of the core processes 104) and an indirect process 176 (e.g., a portion of the indirect processes 106) of the environment 100 of FIG. 1A. The data log collection engine 114, in some examples, may be configured to access any information stored at a particular data log storage region, a particular data log file name at a particular storage location, and/or one or more files having a particular data log file naming convention and stored in a particular storage region. The core processes 174 and indirect process 176, as illustrated, form a portion of a loan processing service. The core processes 174 and indirect process 176 may be distributed across multiple computing systems. The computing systems may be geographically distributed. Further, although illustrated as single data logs per core process 174, certain core processes 174 may be replicated (e.g., running in parallel) to perform tasks on behalf of the loan processing service. For example, multiple web gateways 174a and/or other connection mechanisms for accessing the computing environment hosting the loan processing service may be provided. Additionally, the process 170 may be extended to many different services and systems executing in a computing system environment.

In some implementations the data log collection engine 114 collects a first data log A 172a having data log records related to a web gateway process 174a receiving communications from external devices such as an external consumer device 108a. The web gateway process 174a, for example, acts as a gatekeeper for communications between external parties and a loan processing system.

As illustrated, the web gateway process 174a is configured to communicate with a user authorization process 174b, for example to authorize service execution on behalf of a user connecting to the web gateway 174a using the consumer device 108a. In some implementations, the data log collection engine 114 collects a second data log B 172b having data log records related to the user authorization process 174b.

The user authorization process 174b is configured to communicate with a loan processing application programming interface (API) process 174c. The loan processing API process 174c, for example, may accept user credentials for initiating or continuing loan processing on behalf of the user. In some implementations, the data log collection engine 114 collects a third data log C 172c having data log records related to the loan processing API process 174c.

The loan processing API process 174c is configured to communicate with a loan processing service process 174d. The loan processing service process 174d, for example, may coordinate internal loan processing routines as well as coordinating with one or more external services. As illustrated, the loan processing service 174d is configured to communicate with both an internal loan data retrieval process 174e and an external credit data retrieval process 176. In some implementations, the data log collection engine 114 collects a fourth data log D 172d having data log records related to the loan processing service 174d.

The internal loan data retrieval process 174e is configured to communicate with the database 112 of FIG. 1A. The internal loan data retrieval process 174e, for example, may format and submit database queries to access loan data. In some implementations, the data log collection engine 114 collects a fifth data log E 172e having data log records related to the internal loan data retrieval process 174e.

In some embodiments, the data log collection engine 114 lacks access to log data related to the database 112. However, records in the fifth data log E 172e may include log data regarding communications between the internal loan data retrieval process 174e and the database 112 that provide insight into problems occurring in the database 112.

Similarly, in some embodiments, the data log collection engine 114 lacks access to log data related to the external credit data retrieval process 176, for example because it is an indirectly accessed process (e.g., running on a segment of the system inaccessible to the data log collection engine 114) or a process executed by a third-party system. However, records in the fourth data log D 172d may include log data regarding communications between the loan processing service process 174d and the external credit data retrieval process 176 that provide insight into problems occurring at the external system and//or in the communications between the loan processing service process 174d and the external credit data retrieval process 176.

The loan processing service 174d, in some implementations, is configured to provide response communications for the user via the loan processing API process 174c. For example, as illustrated, the loan processing API process 174c is configured to communicate with a loan processing feedback process 174f. In some embodiments, the data log collection engine 114 collects a sixth data log F 172f having data log records related to the loan processing feedback process 174f. As illustrated, the loan processing feedback 174f is configured to communicate feedback to the user at the external device 108a via the web gateway process 174a.

Figure 2A:
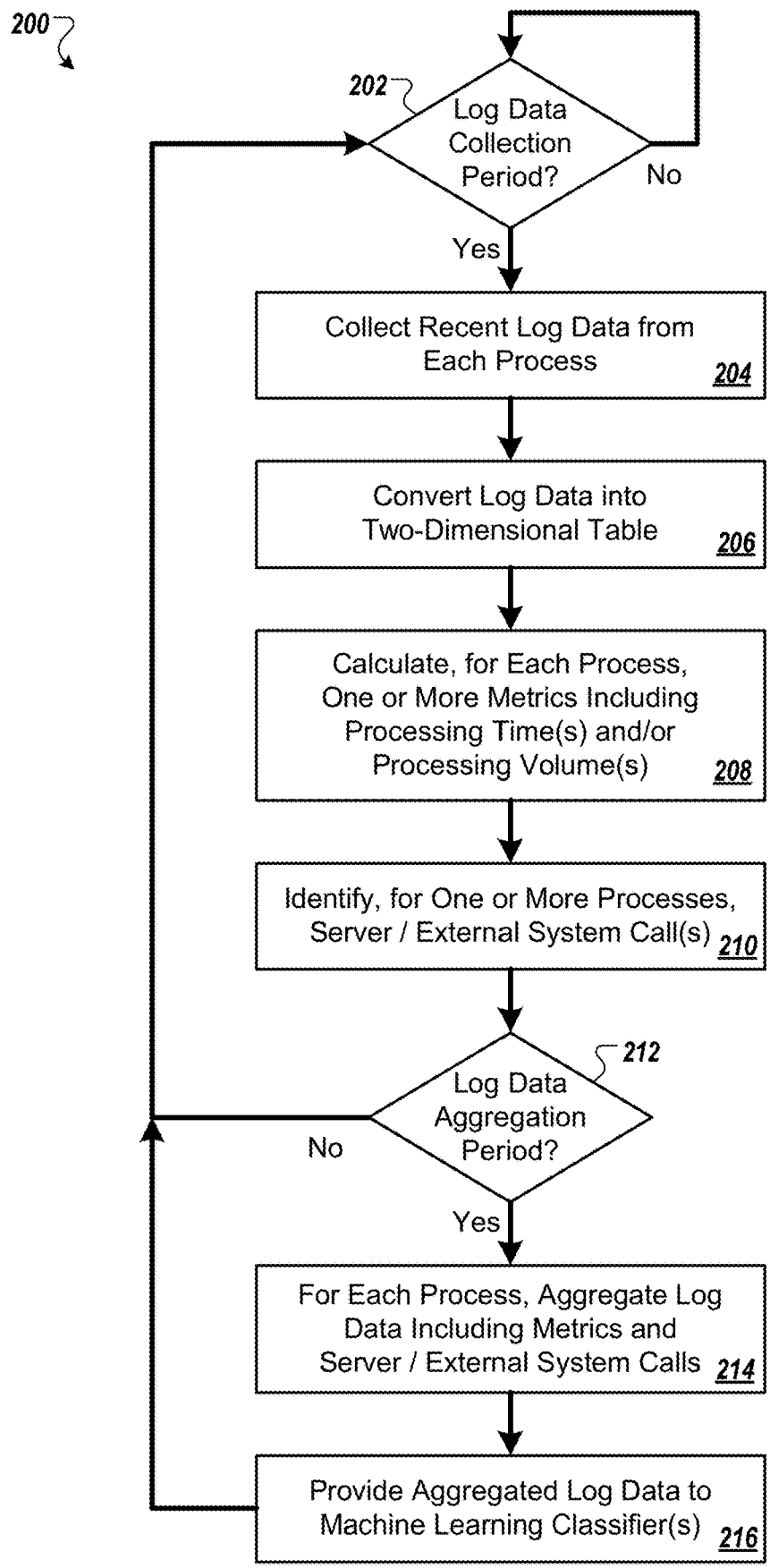
FIG. 2A is a flow chart of an example method for collecting, processing, and aggregating log data for analysis by machine learning classifiers.

Turning to FIG. 2A, a flow chart illustrates an example method 200 for collecting, processing, and aggregating log data for analysis by machine learning classifiers. Portions of method 200, for example, may be performed by the system outage prediction system 102 of FIG. 1A.

In some implementations, the method 200 begins with determining when a log data collection period has begun (202) and collecting recent log data from many processes or even from each process (204). The log data, for example, may be collected in a manner similar to that described in relation to the process 170 of FIG. 1B. For example, the data log collection engine 114 of FIG. 1A may collect the recent log data. The log data collection period, in some examples, may be scheduled to be performed every hour, every half hour, every 20 minutes, every 10 minutes, every 5 minutes, every minute, or every 30 seconds. In some embodiments, different processes may be scheduled for data log collection on different periodic bases. In some examples, depending upon the typical frequency of performance of different processes, the typical size data log generated by different processes, and/or the system burden in collecting data from various systems storing the log data for different processes, data logs for certain processes may be placed on different collection schedules than data logs for other processes.

In some implementations, the log data is converted into a two-dimensional table (206). Depending on the process, the log data may be stored in different formats. A vector format, such as a JSON file format, may be converted to a two-dimensional table format for ease of processing. The log data may be converted, for example, by the data log conversion engine 116 of FIG. 1A.

In some implementations, for many processes or even from each process, one or more metrics are calculated (208). The metrics may include one or more processing times and/or one or more processing volumes. The metrics, for example, may be calculated by the log metrics calculation engine 118 of FIG. 1A. Metrics may vary across processes, for example based in part upon the type of function performed by each process. In illustration, metrics calculated from log data records of the data log E 172e associated with internal loan data retrieval process 174e may include frequency of database accesses (e.g., number of accesses per period of time), size of database accesses (e.g., in bytes), and/or average response time to queries submitted to the database 112. Metrics related to the user authorization process 174b, in another example, may include an average number of user authorization requests by external computing systems per period of time, an average response time to user authorization requests, and/or a number of authorization failures corresponding to a particular source (e.g., user identifier, internet protocol (IP) address, etc.). The metrics may be stored to a storage region, such as the storage region 110 of FIG. 1A as data log metrics 142, as a two-dimensional table. In some embodiments, the data log metrics are stored as a single table for ingestion by one or more machine learning classifiers. In another example, the data log metrics are stored to multiple tables, each for ingestion by one or more machine learning classifiers. The tables, for example, may be separated by software application or set of software applications performing a particular function or service (e.g., a table dedicated to a particular program or service, such as the processing pipeline for the loan processing service illustrated in FIG. 1B). In another example, the tables may be separated by data architecture level. In illustration, the open systems interconnection (OSI) model includes a physical layer (e.g., health of the hardware itself), data link layer (e.g., health of the transference of data over communication means), network layer (e.g., health of packet transfer), transport layer (e.g., health of transference of variable-length data), session layer (e.g., health of communication sessions within the system being monitored), presentation layer (e.g., health of data formatting and translation for communicating data within and through the system), and application layer (e.g., communications within and among application programs executing on the system). A further layer, for example, can include functionality of the application programs themselves, as discussed in relation to FIG. 1B. In a further example, the tables may be separated into process-level data (e.g., such as the processes identified in FIG. 1B), host and container level data (e.g., encapsulation of processes as executable elements along with dependencies, libraries, and other binaries supporting execution of the process within the hardware system), and system data (e.g., CPU, memory, etc.).

Figure 2B:
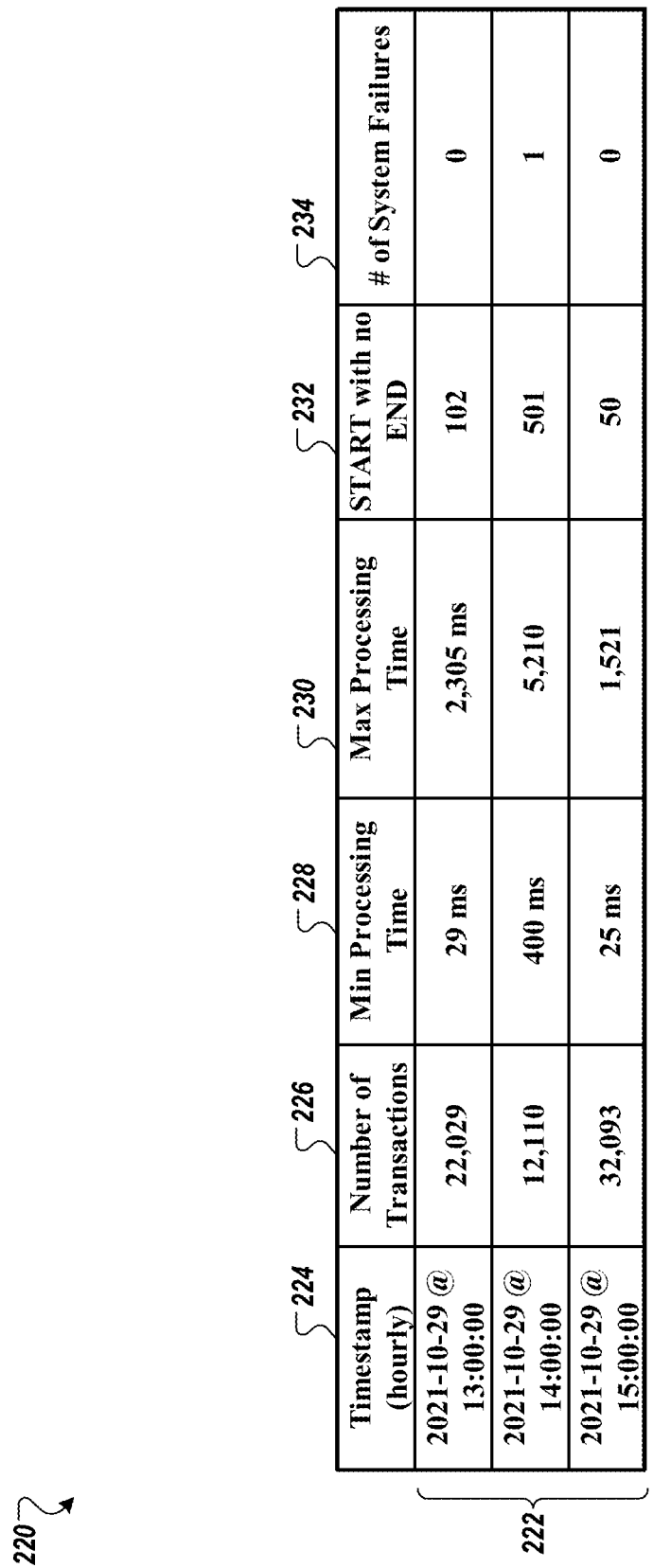
FIG. 2B is an example table of log data metrics.

Turning to FIG. 2B, an example log data table 220 illustrates data records 222 representing timestamped data metrics arranged in a two-dimensional table format. The data records 222, as illustrated, were collected on an hourly basis according to a timestamp column 224 (e.g., the log data collection period). The metrics include a number of transactions metric 226, a minimum processing time metric 228, a maximum processing time metric 230, a start with no end metric 232, and a number of system failures metric 234. The metrics, for example, may represent performance of a particular process, such as the loan processing service process 174d of FIG. 1B.

Returning to FIG. 2A, in some implementations, server and/or external system calls are identified for one or more processes (210). In illustration, the loan processing service process 174d of FIG. 1B calls the external credit data retrieval process 176, so these calls may be identified. In another example, the user authorization process 174b may access (e.g., call into) the loan processing service process 174d, executing on a separate server, via the loan processing API process 174c executing on that server. Thus, calls by the user authorization process 174b to the loan processing API 174c may be identified. In a further example, the web gateway process 174a communicates with multiple external systems 108, so each of these systems may be identified (e.g., by IP address, media access control (MAC) address, etc.).

In some implementations, for each loan data aggregation period (212), the metrics and server/external system calls are aggregated for each process (214). The loan data aggregation period, in some examples, may be every 10 minutes, every 20 minutes, every half hour, every hour, or every two hours. The metrics and server/external system calls may be aggregated, for example, by the metrics aggregation engine 120 of FIG. 1A.

In some implementations, the aggregated log data (e.g., including the aggregated metrics and aggregated server/external system calls) are provided to one or more machine learning classifiers (216). The aggregated log data, for example, may be provided to the machine learning classifiers 146 and/or the metrics analysis engine 122 of FIG. 1A. The aggregated log data, for example, may be used to anticipate system outages and/or other system errors based upon the most recent (e.g., over the log data aggregation period) log data.

Although described as a particular series of operations, in other embodiments, more or fewer operations may be included in the method 200. For example, in some embodiments, the log data may be converted to a standard formatting (e.g., time format, server identifier format, etc.) before or after converting the log data into two dimensional tables (206). In another example, the log data may be filtered (e.g., to select particular data points of interest) before converting the log data into two dimensional tables (206). The filter, in one example, may be based at least in part on manual identification of fields (e.g., by information technology (IT) personnel). In another example, the filtering may select fields identified by past machine learning iterations to be impactful on system health/distress. Further, in some embodiments, certain operations of the method 200 may be performed in a different order or concurrently. For example, the metrics may be calculated (208) concurrently with or after identifying the server/external system calls (210). Other modifications to the method 200 are possible.

Figure 3:
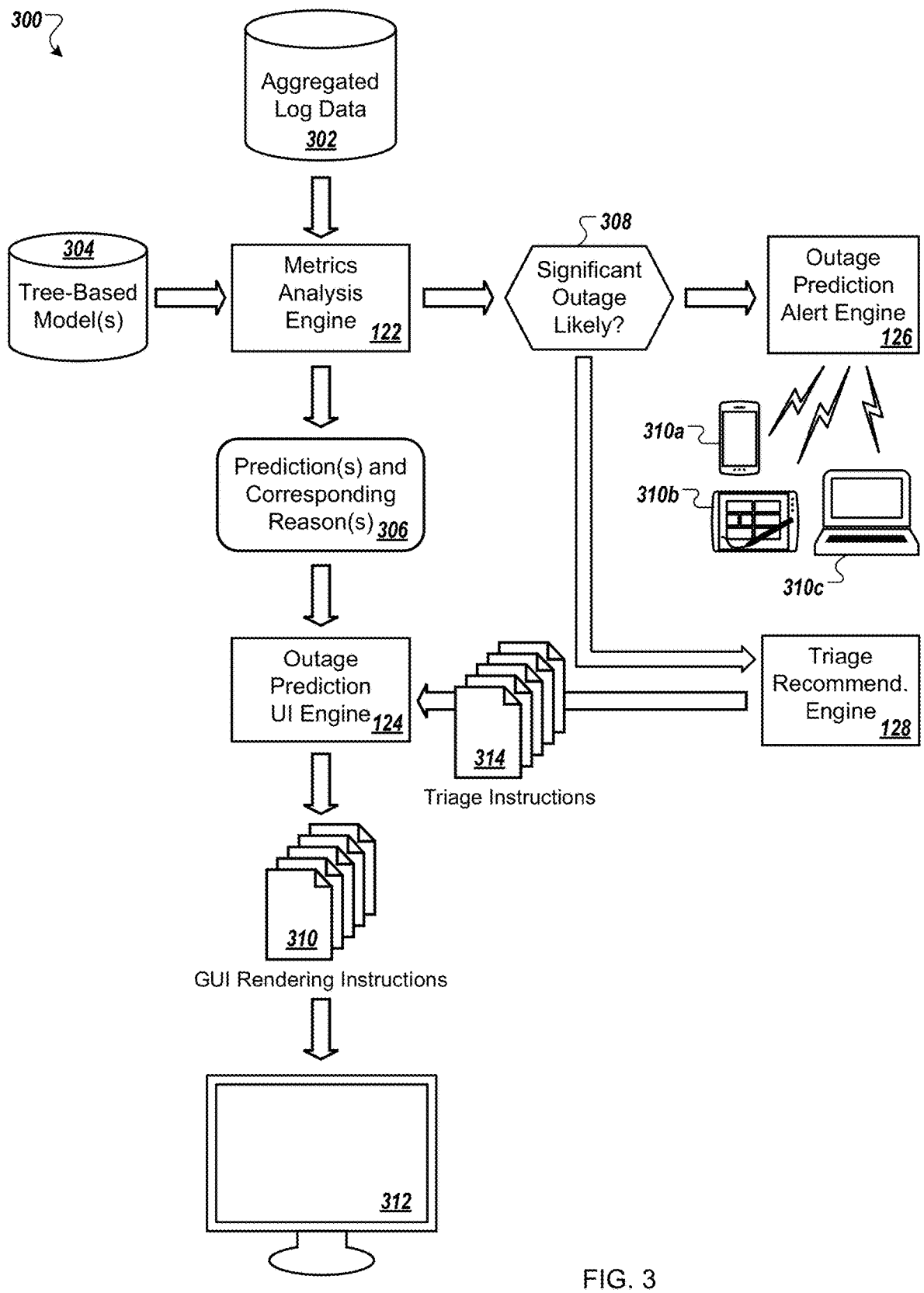
FIG. 3 is a flow diagram of an example process for applying machine learning analysis to predicting and triaging system outages.

FIG. 3 is a flow diagram of an example process 300 for applying machine learning analysis to predicting and triaging system outages. In some implementations, the process 300 begins with obtaining, by the metrics analysis engine 122, aggregated log data 302. The process 300, for example, may receive the aggregated log data from operation 216 of the method 200 of FIG. 2A.

In some implementations, the metrics analysis engine 122 applies a set of tree-based models 304 to the aggregated log data 302. The tree-based models, for example, may apply decision trees that represent a set of rules that, in aggregate, predict a likelihood of a critical error or system outage in the near future. The rules, for example, identify sets of features (e.g., multi-dimensional prediction) that, when occurring in tandem, are likely to lead to a critical error or system outage. Further, the rules, which follow a branching path, result in the identification of a reason for the determination that a particular critical error or location of outage is likely (e.g., the course followed down the branching path). In an illustrative example, the branch may identify that the following collection of metrics, together, are indicative of a likelihood of system outage: CPU utilization [for Machine X, Server X, etc.] is above a first threshold value; average processing time [for Process X, Machine X, Server X, etc.] is above a second threshold value; a number of requests [to Process X, Machine X, Server X, etc.] is mathematically misaligned with the busy state of the CPU and slowness of processing time (e.g., under a third threshold); and a number of re-try attempts [in reaching/communicating with Process X, Machine X, Server X, etc.] is greater than a fourth threshold. The tree-based models, in some examples, may be developed using one or more decision tree learning model algorithms such as a random forest model algorithm to classify data information fields of aggregated log metrics as indicative or not indicative of leading to a critical error or system outage. In another example, the tree-based models may be developed using one or more model tree algorithms to construct multiple decision trees through applying varying tree-splitting algorithms such as linear regression, logistic regression, and/or neural networks. The decision tree learning model algorithms, for example, provide strong accuracy on data sets appropriate to supervised learning (e.g., pre-matched known truth data). The truth data, in this circumstance, involves historic data log records aligned in time (e.g., correspondingly timestamped) with historic system errors and outages.

In some embodiments, a portion of the tree-based models includes neural network-based analysis, for example to categorize criticality of potential errors and/or outages. The neural network-based analysis, in one example, may be performed using a recurrent neural network (RNN). The RNN, for example, may receive additional system information, such as past failure information to categorize likely errors or outages based upon potential impact (e.g., length of outage, extent of effect of outage on system as a whole, etc.). The RNN may include a long short-term memory (LSTM) neural network. In another example, the neural network-based analysis may be performed using a residual neural network (ResNet). The ResNet, for example, may provide an efficient architecture for generating deep analysis of the potential errors and/or outages (using, optionally, the additional system information).

In some implementations, the metrics analysis engine 122 outputs at least one prediction of critical error and/or outage along with corresponding reason(s) 306. The number of critical errors and/or outages may vary based upon system settings and/or load on the monitored network. For example, during high load periods of time, messages may be suppressed such that the list of critical errors and/or outages is not rapidly updated, potentially causing an erratically updating display and thereby confusing the end users. For example, during times of high error, the output may be produced for every N (e.g., three, five, etc.) critical errors. The prediction, in an illustrative example, may be formatted as follows:

TABLE 1

| Feature (Derived) | Feature Value | Explanation Strength |
|---|---|---|
| ProcessingTime_max: INTERNAL_LOAN_DATA_RETRIEVAL | 20,394 | +++ |
| Number of Calls to DATABASE 112 | 511 | +++ |
| ProcessingTime_max: LOAN_PROCESSING_SERVICE | 23,302 | ++ |

As illustrated, each feature includes a human-readable message that an IT professional could interpret and recognize as belonging to a particular process, program, and/or machine. The feature values, for example, present the aggregated metric value provided to the machine learning models 304. The explanation strength may represent a relative strength of prediction, such that, for example, "+" represents that the explanation for the problematic feature is "likely," "++" represents "very likely," and "+++" represents "highly likely." The prediction strengths, for example, may be numeric values supplied by the machine learning algorithm in determining the features causing the critical error(s). The labels of likely, very likely, and highly likely, further to the example, could be used to replace the "+" markings. In other examples, a color-coding (e.g., yellow, orange, and red) or series of icons (e.g., representing caution, warning, and serious alert) could replace the "+" markings.

Further, the metrics analysis engine 122 may output likelihood of critical error and/or outage based on the above reasons. The likelihood, for example, may be provided as a percentage likelihood within a given period of time (e.g., half hour, one hour, two hours, etc.). The period of time, in some embodiments, matches the log data aggregation period (e.g., likelihood of error prior to next window of machine learning analysis). In some embodiments, the machine learning models 304 are configured to provide predictions related to two or more time periods. The prediction, in some implementations, includes only the top explanations for potential difficulties determined by the metrics analysis engine 122 (e.g., based on relative explanation strength, relative likelihood of error, and/or extent of likely impact to the system). In an illustrative example, a top five prediction explanations may be provided by the metrics analysis engine 122. The number of prediction explanations, for example, may be selected based at least in part on a desire to focus IT personnel attention on analyzing a handful of the most important potential problems in the system.

In some implementations, if a significant outage is likely 308, the outage prediction alert engine 126 provides alerts to one or more user devices 310 corresponding to the IT professional team. The devices, for example, may include a smart phone 310a, a tablet computer 310b, and/or a laptop computer 310c. The decision regarding significant outage being likely 308, for example, may be based on at least one of a threshold likelihood of outage (e.g., above 75% likely, at least 80% likely, at least 90% likely, etc.). Further, the decision regarding a significant outage being likely 308 may be based at least in part on an estimated time to outage (e.g., within 15 minutes, within a half hour, within an hour, etc.). For example, the decision to alert members of the team may be based upon both likelihood of the pending concern (e.g., very likely, extremely likely, etc.) as well as the need to quickly assess the problem to avoid system outage or other major event (e.g., less than an hour, less than 30 minutes, etc.). The decision regarding alerting staff based on likelihood of significant outage may also depend in part on time of day and/or day of the week. For example, while staff may be actively monitoring the system during business hours Monday through Friday, a likely critical error anticipated at 3:00 AM on Sunday morning may require release of an alert to obtain prompt attention.

Figure 4A:
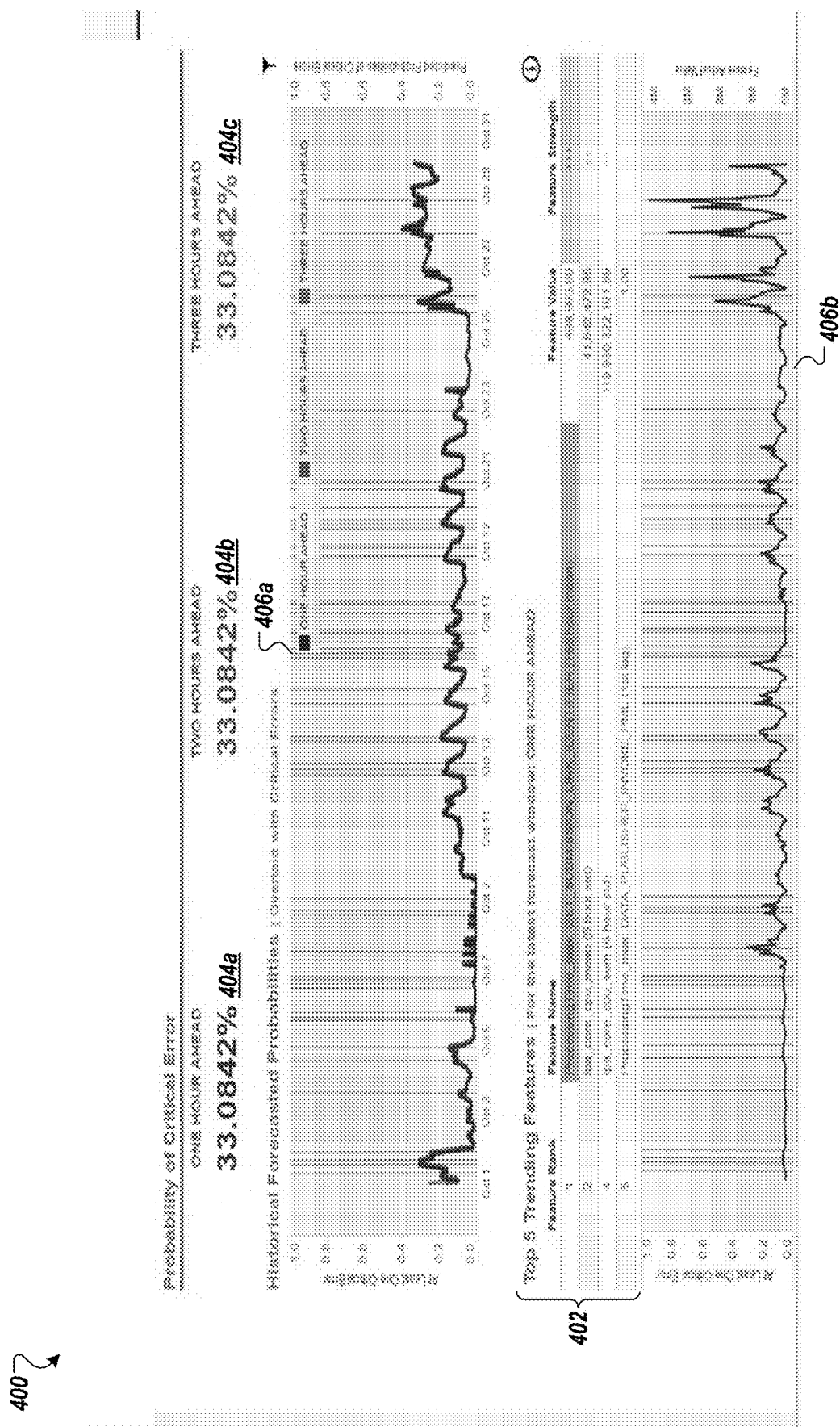
FIG. 4A and FIG. 4B illustrate example user interfaces for providing predictive analytics regarding likelihood of system outages and likely sources of system errors.

In some implementations, the outage prediction user interface engine 124 obtains the predictions and corresponding reasons 306 from the metrics analysis engine 122 and generates graphical user interface (GUI) rendering instructions 310 for presenting information regarding the predictions and corresponding reasons 306 for review by IT personnel at a display 312 of a computing device. The outage prediction UI engine 124, for example, may present information in a format similar to the table 1 above. Turning to FIG. 4A, in some implementations, the GUI rendering instructions 310 are configured to present, as illustrated in an example screen shot 400, a table 402 listing top features likely to lead to critical error and/or system outage. The top features, for example, may be features corresponding to strongest confidence values calculated by the tree-based models 304.

As illustrated in the screen shot 400, estimated probabilities of critical error 404 are presented for a one-hour window of time 404a, a two-hour window of time 404b, and a three-hour window of time 404c. Further, a set of graphs 406a, 406b present historic forecasted probabilities (e.g., over a past month) along with indicators of actual critical errors experienced by the monitored system. In monitoring a match between forecast predictions and actual historic outcome, for example, the IT personnel may gain confidence in the accuracy of the predictions, leading to a greater likelihood of early actions leading to a more robustly executing system. Conversely, as the IT personnel gain trust in the predictive analytics and apply early triage solutions, predicted errors will no longer occur since they were proactively avoided, thereby leading to fewer matches between predictions and errors.

Returning to FIG. 3, in some implementations, when a significant outage is likely 308, the predictions and corresponding reasons 306 are provided to the triage recommendation engine 128 for determining corrective measures to apply to avoid the critical error(s) or condition(s). The triage recommendation engine 128, for example, may provide triage instructions 314 for application by the outage prediction UI engine 124 in preparing the GUI rendering instructions 310.

Figure 4B:
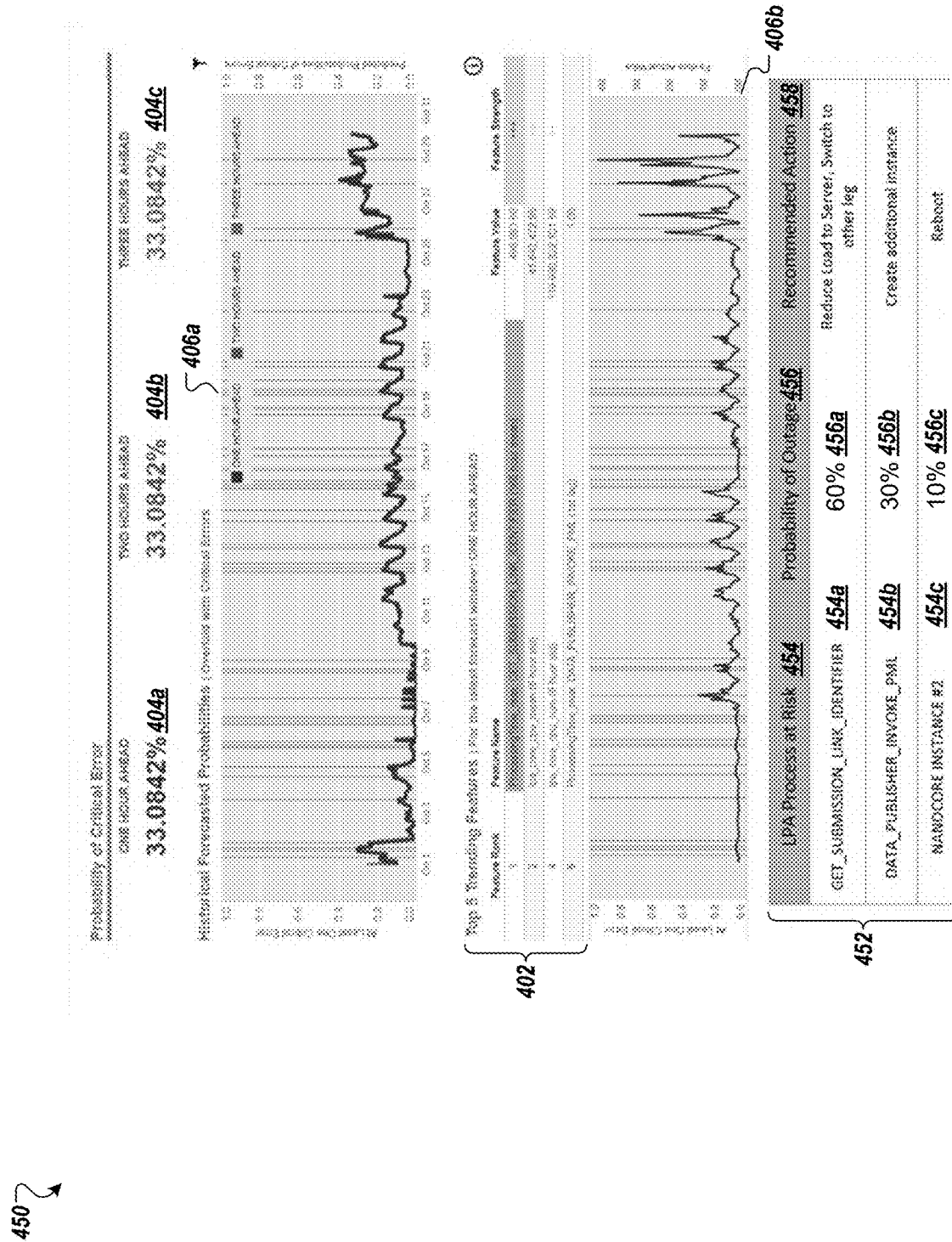

For example, turning to FIG. 4B, an example screen shot 450 illustrates, at the bottom of the elements of the screen shot 400 of FIG. 4A, a recommended triage actions table 452 including, for each at-risk process 454, a probability of outage 456 stemming from the at-risk process and a recommended action 458 to avoid system outage. The probability of outage 456, for example, may be calculated by analyzing top predictors (e.g., metrics) corresponding to a particular prediction (e.g., critical error) to determine the impact of predictors corresponding to each at-risk process 454. For example, as illustrated in FIG. 4B, a top-ranked process at risk 454a has a probability of outage 456a of 60%, a next-ranked process at risk 454b has a probability of outage 456b of 30%, and a third-ranked process at risk 454c has a probability of outage 456c of 10%. In this circumstance, assuming a top 10 predictors in an illustrative example, 6 of the top 10 predictors related to the top-ranked process at risk 454a, while 3 of the top 10 predictors related to the next-ranked process at risk 454b, and only 1 of the top 10 predictors related to the third-ranked process at risk 454c. In other embodiments, more or fewer predictors may be analyzed, such as, in some examples, a top 5 predictors, a top 20 predictors, or all predictors above a threshold N likelihood accuracy. Further, the predictors may be weighted based on type, recency, frequency, and/or other weighting consideration. As illustrated, the recommended actions include "reduce load to server, switch to other leg," "create additional instance," and "reboot."

Returning to FIG. 3, although the process 300 includes an illustrated set of software engines and information presented at example devices, in other embodiments, more or fewer software engines may be included to perform the described operations. For example, the critical error identifying engine 130 may determine whether a significant outage is likely 308. Conversely, rather than determining triage instructions 314 only where it is first determined that a significant outage is likely 308, in other embodiments, the process 300 generates triage recommendations upon each cycle generating predictions and corresponding reasons 306. In further embodiments, the process 300 generates triage recommendations only upon feedback from the user (IT professional) via the GUI generated using the GUI rendering instructions 310. Other modifications of the process 300 are possible.

Reference has been made to illustrations representing methods and systems according to implementations of this disclosure. Aspects thereof may be implemented by computer program instructions. These computer program instructions may be provided to a processor of a general-purpose computer, special purpose computer, or other programmable data processing apparatus and/or distributed processing systems having processing circuitry, such that the instructions, which execute via the processor of the computer or other programmable data processing apparatus, create means for implementing the functions/operations specified in the illustrations.

One or more processors can be utilized to implement various functions and/or algorithms described herein. Additionally, any functions and/or algorithms described herein can be performed upon one or more virtual processors. The virtual processors, for example, may be part of one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

The process data and instructions used to perform various methods and algorithms derived herein may be stored in non-transitory (i.e., non-volatile) computer-readable medium or memory. The claimed advancements are not limited by the form of the computer-readable media on which the instructions of the inventive processes are stored. For example, the instructions may be stored on CDs, DVDs, in FLASH memory, RAM, ROM, PROM, EPROM, EEPROM, hard disk or any other information processing device with which the computing device communicates, such as a server or computer. The processing circuitry and stored instructions may enable the computing device to perform, in some examples, the process 170 of FIG. 1B, the method 200 of FIG. 2A, and/or the process 300 of FIG. 3.

These computer program instructions can direct a computing device or other programmable data processing apparatus to function in a particular manner, such that the instructions stored in the computer-readable medium produce an article of manufacture including instruction means which implement the function/operation specified in the illustrated process flows.

Embodiments of the present description rely on network communications. As can be appreciated, the network can be a public network, such as the Internet, or a private network such as a local area network (LAN) or wide area network (WAN) network, or any combination thereof and can also include PSTN or ISDN sub-networks. The network can also be wired, such as an Ethernet network, and/or can be wireless such as a cellular network including EDGE, 3G, 4G, and 5G wireless cellular systems. The wireless network can also include Wi-Fi®, Bluetooth®, Zigbee®, or another wireless form of communication. The network, for example, may support communications between and within each of the system outage prediction system 102, the systems executing core processes 104, the systems executing indirect processes 106, and/or the consumers 108 of FIG. 1A.

The computing device, in some embodiments, further includes a display controller for interfacing with a display, such as a built-in display or LCD monitor. A general purpose I/O interface of the computing device may interface with a keyboard, a hand-manipulated movement tracked I/O device (e.g., mouse, virtual reality glove, trackball, joystick, etc.), and/or touch screen panel or touch pad on or separate from the display. The display controller and display may enable presentation of the screen shots illustrated, in some examples, in FIG. 4A and FIG. 4B.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, where the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system, in some examples, may be received via direct user input and/or received remotely either in real-time or as a batch process.

Although provided for context, in other implementations, methods and logic flows described herein may be performed on modules or hardware not identical to those described. Accordingly, other implementations are within the scope that may be claimed.

In some implementations, a cloud computing environment, such as Google Cloud Platform™ or Amazon™ Web Services (AWS™), may be used perform at least portions of methods or algorithms detailed above. The processes associated with the methods described herein can be executed on a computation processor of a data center. The data center, for example, can also include an application processor that can be used as the interface with the systems described herein to receive data and output corresponding information. The cloud computing environment may also include one or more databases or other data storage, such as cloud storage and a query database. In some implementations, the cloud storage database, such as the Google™ Cloud Storage or Amazon™ Elastic File System (EFS™), may store processed and unprocessed data supplied by systems described herein. For example, the contents of the data store 110 and/or the database 112 of FIG. 1A, the data logs 172 of FIG. 1B, and/or the aggregated log data 302 of FIG. 3 may be maintained in a database structure.

The systems described herein may communicate with the cloud computing environment through a secure gateway. In some implementations, the secure gateway includes a database querying interface, such as the Google BigQuery™ platform or Amazon RDS™. The data querying interface, for example, may support access by the data log collection engine 114, the metrics analysis engine 122, and/or the core processes 104 of FIG. 1A.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for predicting network service outages in a computing network, the computing network comprising a plurality of processes executing on one or more processors of one or more computing devices, each respective process of at least a portion of the plurality of processes generating log data related to functionality of the respective process, the system comprising:
a non-transitory computer readable medium storing a set of alert rules; and
at least one processor configured to perform a plurality of operations, the operations comprising:
generating training data comprising data entries from a plurality of log data sets and a plurality of associated metrics related to a plurality of processes of a networked computing system, wherein
the plurality of log data sets comprises a portion of log entries identifying a plurality of interactions between at least one given processor of the networked computing system and one or more external computing devices outside of the networked computing system, and
generating the training data comprises repeatedly, for each process of at least a portion of the plurality of processes and over a first window of time,
collecting a log data set generated by the respective process,
converting at least a portion of a plurality of data entries of the log data set into a training data set having a standard format,
calculating, from a subset of the plurality of data entries, one or more metrics related to the respective process, and
time-aligning the training data set with a plurality of corresponding system errors and a plurality of corresponding system outages,
using the training data, training one or more tree-based machine learning classifiers to predict future critical events and/or outages within a threshold window of time prior to each future critical event and/or outage based in part on the plurality of interactions between the at least one given processor of the networked computing system and the one or more external computing devices,
periodically applying the one or more tree-based machine learning classifiers to additional data sets and additional metrics derived from future log data sets of the at least the portion of the plurality of processes, wherein
the future log data sets comprise a plurality of additional interactions between the at least one given processor of the networked computing system and the one or more external computing devices, and
applying comprises:
obtaining, from the one or more tree-based machine learning classifiers, a set of predictions, each prediction of the set of predictions comprising respective reason and a respective confidence, wherein
the respective reason for each prediction of one or more predictions of the set of predictions identifies, based on a portion of the plurality of additional interactions, an indirect process executed by a given external computing device of the one or more external computing devices, wherein
the indirect process was called by a given process of the plurality of processes, and applying the set of alert rules to the set of predictions to determine one or more alerts to issue regarding at least one prediction of the set of predictions, and
using the additional data sets and additional metrics, periodically updating the training of the one or more tree-based machine learning classifiers.

2. The system of claim 1, wherein the standard format of the training data set comprises a two-dimensional table.

3. The system of claim 1, wherein the threshold window of time is between ten minutes and two hours.

4. The system of claim 1, wherein the periodically applying the one or more tree-based machine learning classifiers is performed more frequently than the threshold window of time.

5. The system of claim 1, wherein, for one or more of the plurality of processes, the one or more metrics comprise at least one of a maximum processing time metric, a minimum processing time metric, and a process start with no end metric.

6. The system of claim 1, wherein training the one or more tree-based machine learning classifiers comprises executing one or more model tree algorithms to construct multiple decision trees based on at least a portion of the training data.

7. The system of claim 1, wherein the respective reason for each prediction of at least a portion of the set of predictions identifies a given process of the plurality of processes, a computing device, or a data store exhibiting conditions predicted to contribute to at least one critical error or critical event.

8. The system of claim 1, wherein generating the training data comprises, for each process of one or more respective processes of the plurality of processes, identifying a plurality of external calls to the respective process, wherein each external call of the plurality of external calls is directed to a given process, a given computing device, a given database, or a given service external to the respective process.

9. The system of claim 8, wherein each external call directed to the given process is directed to a process different than the plurality of processes.

10. The system of claim 1, wherein the operations comprise:
analyzing the set of predictions to determine a set of top features most likely to lead to a critical error and/or a system outage; and
causing presentation of the set of top features at a graphical user interface of a computing device.

11. The system of claim 10, wherein:
the operations comprise ranking the set of top features by at least one of urgency and confidence of prediction; and
causing presentation of the set of top features comprises causing presentation of the set of top features in order of the ranking.

12. The system of claim 1, wherein the operations comprise:
analyzing the set of predictions to determine a set of top processes of the plurality of processes at greatest risk of producing a critical error or an outage; and
identifying, for each process of the set of top processes, a corresponding action for avoiding a respective critical error or a respective outage.

13. The system of claim 12, wherein the operations comprise causing presentation of the set of top processes and the corresponding action for each process of the set of top processes at a graphical user interface of a computing device.

14. The system of claim 13, wherein:
the operations comprise ranking the set of top processes by at least one of urgency and confidence of prediction; and
causing presentation of the set of top processes comprises causing presentation of the set of top processes in order of the ranking.

15. The system of claim 13, wherein the operations comprise automatically applying, for at least one process of the set of top processes, the corresponding action.

16. The system of claim 13, wherein the corresponding action, for at least one process of the set of top processes, comprises rebooting a computing device or reducing load on a computing device.

17. The system of claim 1, wherein the at least one processor comprises at least one of i) software logic comprising a plurality of instructions stored to a non-transitory computer readable medium, the plurality of instructions configured to, when executed on one or more processors, perform at least a first portion of the plurality of operations, or ii) hardware logic configured to execute at least a second portion of the plurality of operations.

18. A method for predicting network service outages in a computing network, the computing network comprising a plurality of processes executing on one or more processors of one or more computing devices, each respective process of at least a portion of the plurality of processes generating log data related to functionality of the respective process, the method comprising:
generating, by at least one processor, training data comprising data entries from a plurality of log data sets and a plurality of associated metrics related to at least a portion of a plurality of processes of a networked computing system, wherein
the plurality of log data sets comprises a portion of log entries identifying a plurality of interactions between at least one given processor of the networked computing system and one or more external computing devices outside of the networked computing system, and
generating the training data comprises,
for each process of the plurality of processes and over a window of time, periodically;
collecting a log data set generated by the respective process,
converting at least a portion of a plurality of data entries of the log data set into a training data set having a standard format,
calculating, from a subset of the plurality of data entries, one or more metrics related to the respective process, and
time-aligning the training data set with a plurality of corresponding system errors and a plurality of corresponding system outages:
for each process of the at least the portion of the plurality of processes, aggregating each training data set of each process of the plurality of processes and the one or more metrics related to each process of the plurality of processes to produce aggregated training data and aggregated metrics;
using at least the aggregated training data and the aggregated metrics, training, by the at least one processor, one or more tree-based machine learning models to predict future critical events and/or outages within a threshold window of time prior to each future critical event and/or outage based in part on the plurality of interactions between the at least one given processor of the networked computing system and the one or more external computing devices;
periodically applying, by the at least one processor, the one or more tree-based machine learning models to additional data sets and additional metrics derived from future log data sets of the at least the portion of the plurality of processes to assess the networked computing system for risk of critical errors and/or system outages, wherein
the future log data sets comprise a plurality of additional interactions between the at least one given processor of the networked computing system and the one or more external computing devices, and
applying comprises;
obtaining, from the one or more tree-based machine learning models, a set of predictions, each prediction of the set of predictions comprising a respective reason and a respective confidence, wherein
the respective reason for each prediction of one or more predictions of the set of predictions identifies, based on a portion of the plurality of additional interactions, an indirect process executed by a given external computing device of the one or more external computing devices, wherein
the indirect process was called by a given process of the plurality of processes,
analyzing the set of predictions to determine a set of top processes of the plurality of processes at greatest risk of producing a respective critical error or a respective system outage related to a respective process of the set of top processes, and
identifying, for each process of the set of top processes, a corresponding action for avoiding the respective critical error or the respective system outage; and
using the additional data sets and additional metrics, periodically updating, by the at least one processor, the training of the one or more tree-based machine learning models.

* * * * *